R. S. PELTON.
BRAKE MECHANISM FOR AUTOMOBILES.
APPLICATION FILED JAN. 4, 1912.

1,050,686.

Patented Jan. 14, 1913.

WITNESSES
Samuel E. Wade
Amos W. Hart

INVENTOR
ROBERT S. PELTON,
BY Munn & Co.
ATTORNEYS

UNITED STATES PATENT OFFICE.

ROBERT S. PELTON, OF MONTICELLO, NEW YORK.

BRAKE MECHANISM FOR AUTOMOBILES.

1,050,686.   Specification of Letters Patent.   Patented Jan. 14, 1913.

Application filed January 4, 1912. Serial No. 669,315.

*To all whom it may concern:*

Be it known that I, ROBERT S. PELTON, a citizen of the United States, and a resident of Monticello, in the county of Sullivan and State of New York, have invented an Improved Brake Mechanism for Automobiles, of which the following is a specification.

My invention is applicable to auto vehicles having a compensating or differential gear which operatively connects the inner adjacent ends of alined axles or axle-sections on which the rear or driving wheels are keyed. I employ brake levers which are peculiarly constructed and arranged for joint or separate operation, and I connect them with separate and independent brakes applied to the respective driving wheels, so that either wheel may be locked when it is desired to prevent it slipping in the mud, the propulsive effect of the motor being in such case applied to the other wheel resting on dry ground.

The details of construction, arrangement, and operation of parts are as hereinafter described, and illustrated in the accompanying drawing, in which—

Figure 1:
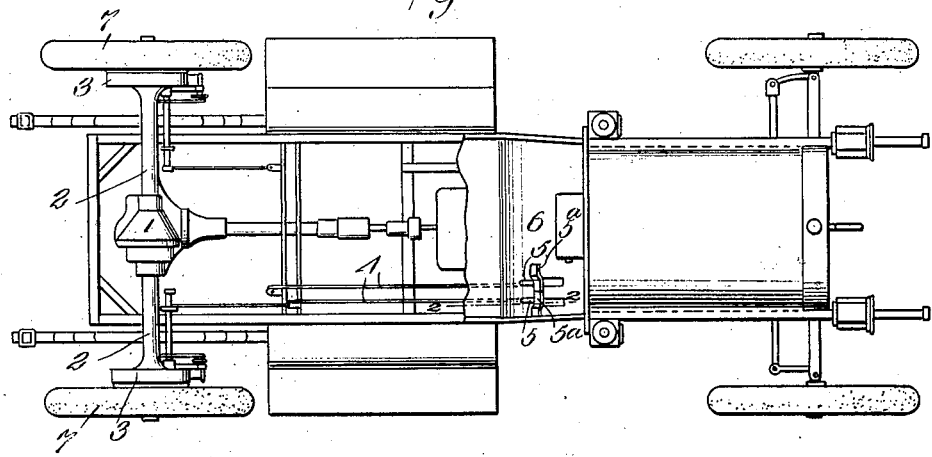
Figure 2:
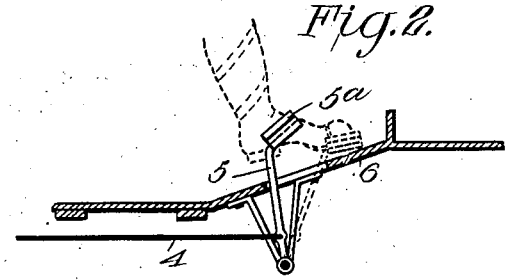
Figure 3:
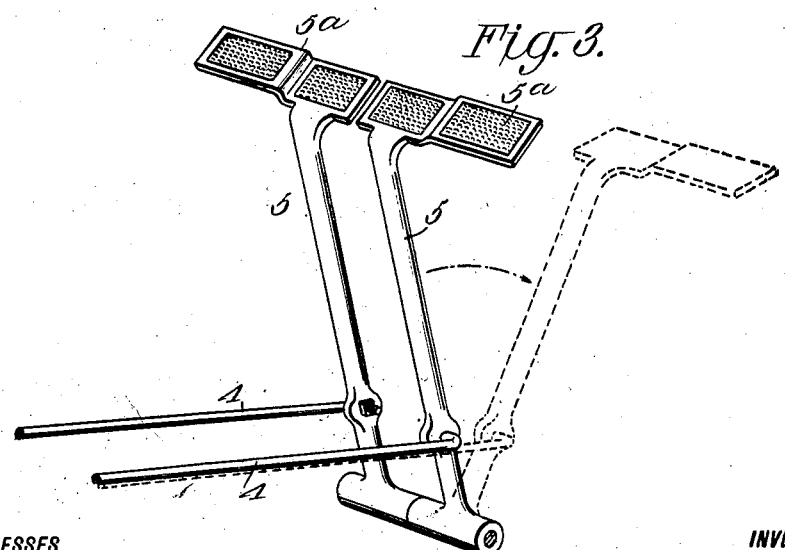

Figure 1 is a plan view of the frame and running gear of an automobile, with my improvement applied. Fig. 2 is mainly a longitudinal section on the line 2—2 of Fig. 1. Fig. 3 is a perspective view of the brake levers.

Compensating or differential gearing 1 operatively conects the alined rear axle-sections 2. A friction band-brake 3 is applied to each axle or driving-wheel in a well known way. Each brake is connected by one or more rods 4 with one of the two foot-levers 5 which are fulcrumed on the frame and project above the inclined foot-board 6 with which automobiles are ordinarily provided.

The two levers 5 are arranged side by side, and each is provided with a head 5ª extended laterally in both directions. Thus the heads abut on the inner side and project outward laterally on the opposite side. The inner portions are cut away, as shown, to provide space for the application of the foot of the chauffeur, so that both brake-levers and brakes may be operated simultaneously when it is desired. The outer ends of the heads 5ª are preferably formed as projections or blocks and the chauffeur may apply his foot to either when it is desired to apply but one brake.

The differential gear allows either driving wheel 7 to rotate at a higher or lower rate of speed than the other, which facilitates turning corners or describing curves generally.

It sometimes happens that one of the wheels will strike a slippery place or enter mud, which is quite soft and allows such wheel to slip or rotate without propelling the vehicle, while the other opposite wheel will be upon solid ground. The wheel which turns easiest is the one which will do the propelling, and consequently the wheel which is on the slippery place or in the soft mud will rotate without effecting the desired propulsion of the vehicle. In other words, one of the wheels will "race", since all the motion or propulsive effect of the motor will be transmitted to it and the other wheel will remain stationary. It is therefore necessary to apply resistance to the wheel which is on a slippery place or in the mud, so that, through the differential gear, a greater tractive force may be applied to the wheel which is on the solid ground. For this purpose, I operate the brake which is connected with the wheel in the mud, and thus hold it stationary, or, in other words, prevent its rotation, so that the differential gear will apply the entire propulsive force to the other wheel, and thus the vehicle will be pulled out of the mud or off the slippery place. In brief, I provide a brake mechanism by which both brakes may be applied simultaneously, or either singly in an emergency such as above stated.

Each of the heads 5ª of the brake levers is cut away as to its inner half or end, thus leaving a projection on the outer side. When the chauffeur applies his foot to the adjacent cut-away portions of the heads, both levers are operated simultaneously, but upon applying his foot to either of the outer projections, the corresponding lever will be operated singly.

The general principle of my invention is applicable to the so-called emergency brake, that is to say, two emergency brake levers may be arranged side by side and connected separately to the driving wheels and the levers may be connected by a slip ring to keep them together for ordinary braking, but the ring may be slipped off in case the machine should be stalled in the mud and it be required to apply either brake separately.

What I claim is:—

1. The combination, with driving-wheels and alined axle sections, a differential gearing applied to such sections and operatively connecting the same, and separate brakes applied to the respective axles, of two treadle brake-levers and two rods connecting them with the brakes of the respective independent wheels, the levers being arranged side by side and having heads adapted for simultaneous application of the foot to both, whereby they may be operated singly or together, substantially as described.

2. The combination, with driving-wheels and alined axle-sections, differential gearing, and separate brakes applied to the respective axles, of two brake levers and two rods connecting them with the respective brakes, said levers arranged side by side and having heads extended laterally toward each other, such extensions being in the proximity required for the operation of both brakes simultaneously by the application of the foot of the chauffeur to the contiguous portions of the heads, substantially as described.

ROBERT S. PELTON.

Witnesses:
 IDA SCHERMAN,
 NELLIE CHILDS SMITH.